US011756488B2

(12) United States Patent
Kim et al.

(10) Patent No.: US 11,756,488 B2
(45) Date of Patent: Sep. 12, 2023

(54) DISPLAY DEVICE AND METHOD OF DRIVING THE SAME

(71) Applicant: SAMSUNG DISPLAY CO., LTD., Yongin-si (KR)

(72) Inventors: Sang Kuk Kim, Yongin-si (KR); Deok Jun Choi, Yongin-si (KR); Ji Hyun Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 48 days.

(21) Appl. No.: 17/401,829

(22) Filed: Aug. 13, 2021

(65) Prior Publication Data

US 2022/0262316 A1 Aug. 18, 2022

(30) Foreign Application Priority Data

Feb. 18, 2021 (KR) ........................ 10-2021-0022177

(51) Int. Cl.
*G06F 3/038* (2013.01)
*G09G 3/3275* (2016.01)

(52) U.S. Cl.
CPC ... *G09G 3/3275* (2013.01); *G09G 2310/0243* (2013.01); *G09G 2310/08* (2013.01); *G09G 2320/02* (2013.01); *G09G 2370/00* (2013.01)

(58) Field of Classification Search
CPC ......... G09G 3/3275; G09G 2310/0243; G09G 2310/08; G09G 2320/02; G09G 2370/00
USPC .......................................................... 345/214
See application file for complete search history.

(56) References Cited

U.S. PATENT DOCUMENTS

| | | | | |
|---|---|---|---|---|
| 7,142,187 | B1 | 11/2006 | Kim et al. | |
| 7,161,970 | B2 | 1/2007 | Lim et al. | |
| 2015/0294647 | A1 * | 10/2015 | Roh | G09G 5/18 345/214 |
| 2020/0160792 | A1 * | 5/2020 | Park | G09G 3/3677 |
| 2020/0168143 | A1 * | 5/2020 | Yamamoto | G09G 3/20 |

FOREIGN PATENT DOCUMENTS

KR 100510499 B1 8/2005

* cited by examiner

*Primary Examiner* — Jonathan M Blancha
(74) *Attorney, Agent, or Firm* — CANTOR COLBURN LLP

(57) ABSTRACT

A display device includes an oscillator which generates a reference clock signal having a frequency corresponding to frequency information provided from an external device, a register which stores a signal parameter for the reference clock signal, and the signal parameter indicates the number of pulses of the reference clock signal included in one horizontal time, a data driver which applies data signals to data lines connected to pixels based on the one horizontal time, and a controller which changes the signal parameter based on a change in the frequency of the reference clock signal in a way such that the one horizontal time is maintained substantially constant.

17 Claims, 16 Drawing Sheets

LUT

| RATIO | SUM_REF0 | SUM_REF1 | SUM_REF2 | SUM_REF3 |
|---|---|---|---|---|
| SUM_REF0 | 1 | REF0/REF1 | REF0/REF2 | REF0/REF3 |
| SUM_REF1 | REF1/REF0 | 1 | REF1/REF2 | REF1/REF3 |
| SUM_REF2 | REF2/REF0 | REF2/REF1 | 1 | REF2/REF3 |
| SUM_REF3 | REF3/REF0 | REF3/REF1 | REF3/REF2 | 1 |

FIG. 6C

| CLK_R Freq. (MHz) | 1H Freq. (KHz) | |
|---|---|---|
| | Function off | Function on |
| 164.9 | 392.2 | 392.2 |
| 170.5 | 405.1 | 392.4 |
| Δ | −12.9 | −0.2 |

| CLK_R Freq. (MHz) | Brightness | | | |
|---|---|---|---|---|
| | 255 Gray | | 72 Gray | |
| | Function off | Function on | Function off | Function on |
| 164.9 | 537.3 | 537.3 | 33.36 | 33.36 |
| 170.5 | 550.3 | 537.6 | 35.43 | 33.46 |
| Δ | −13 | 0.3 | −2.07 | −0.1 |

DISPLAY DEVICE AND METHOD OF DRIVING THE SAME

The application claims priority to Korean Patent Application No. 10-2021-0022177, filed Feb. 18, 2021, and all the benefits accruing therefrom under 35 U.S.C. § 119, the content of which in its entirety is herein incorporated by reference.

BACKGROUND

1. Field

Embodiments of the invention relate to a display device and a method of driving the display device.

2. Description of the Related Art

A display device typically includes a pixel unit including pixels for displaying an image and a display driving circuit for controlling an operation of the pixel unit. The display driving circuit may generate a reference clock signal that serves as a reference for determining timing of various control signals (for example, a synchronization signal, a data signal, a scan signal, and the like) used to display an image by the pixel unit in the display device.

SUMMARY

A display device may transmit data through a specific communication method with an external device, and a frequency of a reference clock signal is set to avoid a communication band. In consideration of the communication environment, product, and the like, an optimal reference clock signal may be set to maximize communication sensitivity. In a process of setting the optimal reference clock signal, the frequency of the reference clock signal may be changed.

A control signal (for example, a horizontal synchronization signal) used in the display device may be set by dividing the reference clock signal. As the frequency of the reference clock signal changes, the control signal (for example, a frequency of one horizontal period or a pulse width) may be changed, and display quality may be deteriorated due to the change in the control signal. For example, the image may be displayed with a luminance different from a target luminance when the controls signal is changed.

Embodiments of the invention provide a display device capable of effectively maintaining a constant control signal even when a frequency of a reference clock signal is changed, and a method of driving the display device.

In an embodiment of the invention, a display device includes an oscillator which generates a reference clock signal having a frequency corresponding to frequency information provided from an outside; a register which stores a signal parameter for the reference clock signal, where the signal parameter indicates a number of pulses of the reference clock signal included in one horizontal time; a data driver which applies data signals to data lines connected to pixels based on the one horizontal time; and a controller which changes the signal parameter based on a change in the frequency of the reference clock signal in a way such that the one horizontal time is maintained substantially constant.

According to an embodiment, the controller may calculate a ratio between a first frequency and a second frequency of the reference clock signal, and change the signal parameter based on the ratio. In such an embodiment, the first frequency may correspond to previous frequency information of the reference clock signal at a previous time point, and the second frequency may correspond to the frequency information of the reference clock signal at a current time point.

According to an embodiment, the controller may calculate the ratio using a lookup table in which the ratio corresponding to the first frequency and the second frequency is defined.

According to an embodiment, the controller may generate a changed signal parameter by multiplying the signal parameter by the ratio.

According to an embodiment, the controller may compensate the ratio based on sequence information indicating sequential operations of the oscillator in response to the frequency information.

According to an embodiment, the oscillator may gradually change the frequency of the reference clock signal from the first frequency to the second frequency based on the sequence information, and the controller may gradually change the ratio to a target ratio corresponding to the second frequency in response to a gradual change in the frequency of the reference clock signal.

According to an embodiment, the frequency information may be provided from an application processor, and the frequency information may be set in a way such that a fundamental frequency and a harmonic of the reference clock signal avoid a communication band through which data is transmitted between the application processor and an external device.

According to an embodiment, the oscillator may change the frequency of the reference clock signal based on the frequency information until sensitivity of the communication band becomes equal to or greater than a reference sensitivity.

According to an embodiment, the controller may count a number of clocks of the reference clock signal in response to an external clock signal, calculate the ratio based on the number of the clocks of the reference clock signal, and change the signal parameter based on the ratio.

According to an embodiment, the oscillator may change the frequency of the reference clock signal in a porch section, and the controller may change the signal parameter in the porch section.

In an embodiment of the invention, a method of driving a display device includes generating a reference clock signal having a frequency corresponding to frequency information; calculating a ratio based on a predetermined reference frequency and the frequency of the reference clock signal; updating a changed signal parameter by changing a signal parameter based on the ratio, where the signal parameter is set to be corresponding to the reference frequency, and the signal parameter indicates the number of pulses of the reference clock signal included in one horizontal time; generating a driving control signal based on the reference clock signal and the signal parameter; and applying data signals to data lines connected to pixels based on the one horizontal time according to the driving control signal. In such an embodiment, the updating the changed signal parameter includes changing the signal parameter in a way such that the one horizontal time is maintained substantially constant.

According to an embodiment, the calculating the ratio may include using a lookup table, in which the ratio corresponding to the reference frequency and the frequency is defined, to calculate the ratio.

According to an embodiment, the updating the changed signal parameter may include generating the changed signal parameter by multiplying the signal parameter by the ratio.

According to an embodiment, the method further include receiving the frequency information from an application processor. In such an embodiment, the frequency information may be set in a way such that a fundamental frequency and a harmonic of the reference clock signal avoid a communication band through which data is transmitted between the application processor and an external device.

According to an embodiment, the receiving the frequency information may include receiving sensitivity of the communication band from the external device by the application processor; changing the frequency information in response to the sensitivity by the application processor when the sensitivity is lower than a reference sensitivity; and requesting the external device to identify the sensitivity of the communication band in response to a change of the frequency information.

According to an embodiment, the calculating the ratio may include compensating the ratio based on sequence information indicating sequential operations for generating the reference clock signal in response to the frequency information.

According to an embodiment, the calculating the ratio may include counting a number of clocks of the reference clock signal having the frequency in response to an external clock signal; and calculating the ratio based on a number of reference clocks corresponding to the reference frequency and the number of the clocks of the reference clock signal.

BRIEF DESCRIPTION OF THE DRAWINGS

The above and other features of the invention will become more apparent by describing in further detail embodiments thereof with reference to the accompanying drawings, in which:

FIG. 6C is a diagram for explaining an effect of the operation of the display driving circuit of FIG. 4;

DETAILED DESCRIPTION

Figure 1:
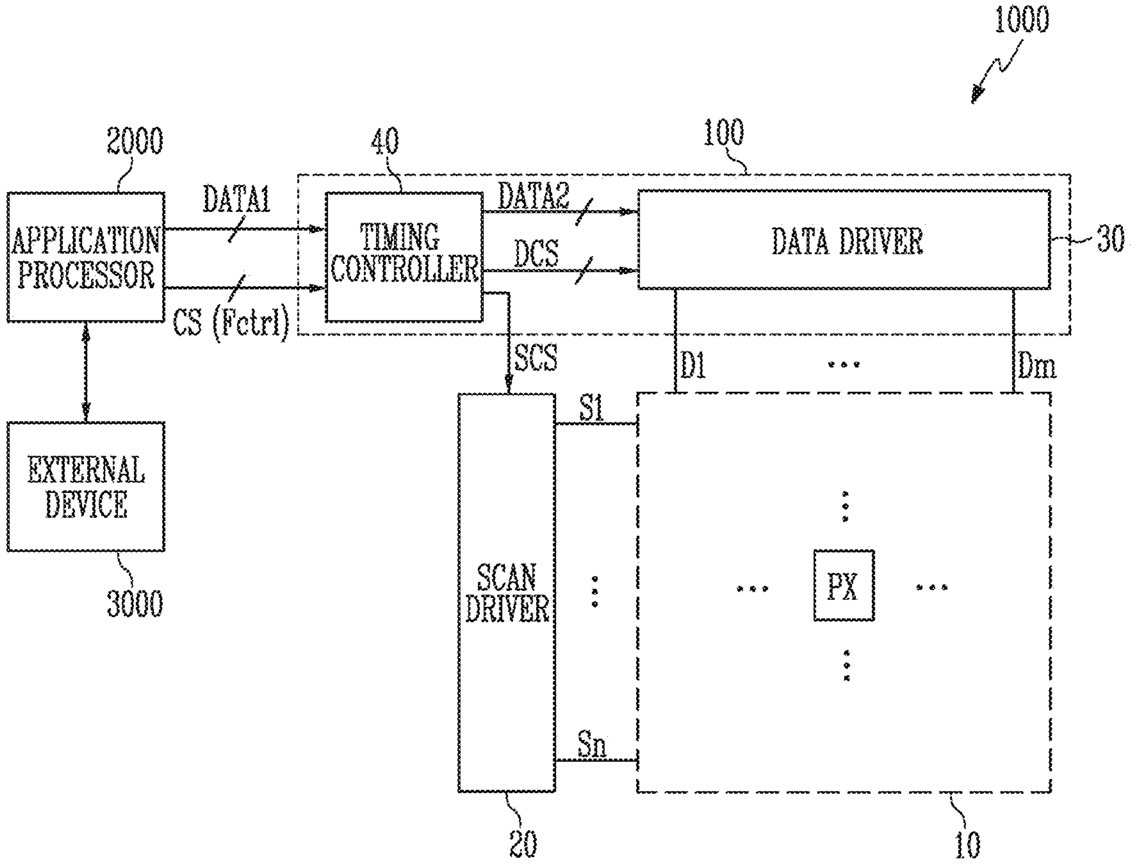
FIG. 1 is a diagram schematically illustrating a display device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

Meanwhile, in the drawings, some elements which are not directly related to the features of the disclosure may be omitted to clearly represent the disclosure. In addition, some elements in the drawings may be shown to be exaggerated in size or proportion. Throughout the drawings, the same or similar elements will be given by the same reference numerals and symbols as much as possible even though they are shown in different drawings, and repetitive detailed descriptions will be omitted or simplified.

As is customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the present claims.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a diagram schematically illustrating a display device according to an embodiment of the invention.

Referring to FIG. 1, an embodiment of a display device 1000 may include a pixel unit 10, a scan driver 20, a data driver 30, and a timing controller 40.

The display device 1000 may be a flat panel display device, a flexible display device, a curved display device, a foldable display device, a bendable display device, or a stretchable display device. The display device 1000 may be applied to a transparent display device, a head-mounted display device, a wearable display device, or the like. In addition, the display device 1000 may be applied to various electronic devices such as a smart phone, a tablet, a smart pad, a television ("TV"), and a monitor.

The display device 1000 may be implemented as a self-light emitting display device including a plurality of self-light emitting elements. In one embodiment, for example, the display device 1000 may be an organic light emitting display device including organic light emitting elements, a display device including inorganic light emitting elements, or a display device including light emitting elements including or composed of a combination of an inorganic material and an organic material, for example, but not being limited thereto. Alternatively, the display device 1000 may be implemented as a liquid crystal display device, a plasma display device, or a quantum dot display device.

In such an embodiment, the pixel unit 10 may include scan lines S1 to Sn, data lines D1 to Dm, and pixels PX, where n and m may be integers greater than 1. The pixels PX may be electrically connected to the data lines D1 to Dm and the scan lines S1 to Sn. According to an embodiment, at least one scan line may be connected to each of the pixels PX.

The pixels PX may emit light with grayscale and luminance corresponding to a data signal supplied thereto from the data lines D1 to Dm.

The scan driver 20 may receive a scan control signal SCS from the timing controller 40. The scan driver 20 receiving the scan control signal SCS may supply a scan signal to the scan lines S1 to Sn. In one embodiment, for example, the scan control signal SCS may include a start signal, scan clock signals, and the like.

The scan driver 20 may be disposed or formed on one area of the pixel unit 10 (or one area of a display panel), or may be implemented as an integrated circuit ("IC") and mounted on a flexible circuit board to be connected to the pixel unit 10. In an embodiment, the scan driver 20 may be positioned on both opposing sides with the pixel unit 10 interposed therebetween.

The data driver 30 may generate the data signal (or a data voltage) based on a data control signal DCS and image data DATA2, and provide the data signal to the data lines D1 to Dm. Here, the data control signal DCS may be a signal that controls an operation of the data driver 30 and may include a sampling signal (or a latch signal), a source output signal (or a data enable signal), and the like.

In one embodiment, for example, the data driver 30 may include a latch that latches line data of the image data DATA2 in response to the sampling signal, a digital-to-analog converter (or a decoder) that converts the latched line data (for example, digital data) into analog data signals using gamma voltages, and buffers (or amplifiers) that output the data signals to the data lines D1 to Dm.

The data driver 30 may be implemented as an IC (for example, a driver IC), and may be mounted on the flexible circuit board to be connected to the pixel unit 10.

The timing controller 40 may receive input image data DATA1 and a control signal CS from an application processor 2000 (or a graphic processor). The timing controller 40 may generate the scan control signal SCS and the data control signal DCS based on the control signal CS. In such an embodiment, the timing controller 40 may rearrange and output the input image data DATA1 into the image data DATA2 corresponding to the pixel arrangement of the pixel unit 10.

In an embodiment, at least some functions of the data driver 30 and the timing controller 40 may be integrated as a display driving circuit 100. In one embodiment, for example, the display driving circuit 100 may be provided in the form of an IC that performs both the functions of the data driver 30 and the timing controller 40.

In an embodiment, the control signal CS may include frequency information Fctrl. The display driving circuit 100 (or the timing controller 40) may generate a reference clock signal based on the frequency information Fctrl, generate synchronization signals (for example, the horizontal synchronization signal) based on the reference clock signal, and generate the scan control signal SCS (for example, a scan clock signal) and the data control signal DCS based on the reference clock signal and the synchronization signals. The frequency information Fctrl may be a set value regarding a frequency of the reference clock signal. However, the invention is not limited thereto, and alternatively, the frequency information Fctrl may be a clock signal corresponding to the frequency of the reference clock signal.

A configuration of the display driving circuit 100 that outputs the reference clock signal based on the frequency information Fctrl will be described later in detail with reference to FIG. 2.

The application processor 2000 may transmit and receive data with an external device 3000 through a specific communication method. In such an embodiment, the application processor 2000 may determine the frequency of the reference clock signal to avoid a communication band between the application processor 2000 and the external device 3000 to thereby prevent interference of the reference clock signal for data transmission and reception (i.e., to prevent deterioration of communication sensitivity). In such an embodiment, the application processor 2000 may set the frequency information Fctrl in a way such that the reference clock signal having a frequency avoiding the communication band is generated.

The relationship between the communication band and the frequency of the reference clock signal will be described later in detail with reference to FIGS. 3A and 3B.

In an embodiment, as shown in FIG. 1, the scan lines may include n scan lines S1 to Sn, but the invention is not limited thereto. In one alternative embodiment, for example, the pixels PX positioned on a current horizontal line (or a current pixel row) may be additionally connected to the scan line positioned on a previous horizontal line (or a previous pixel row) and/or the scan line positioned on a subsequent horizontal line (or a subsequent pixel row) depending on a circuit structure of the pixels PX. In such an embodiment, dummy scan lines, not shown, may be additionally formed in the pixel unit 10.

In an embodiment, emission control lines may be additionally connected to the pixels PX depending on a circuit structure of the pixels PX. The display device 1000 may further include an emission driver for driving the emission control lines.

Figure 2:
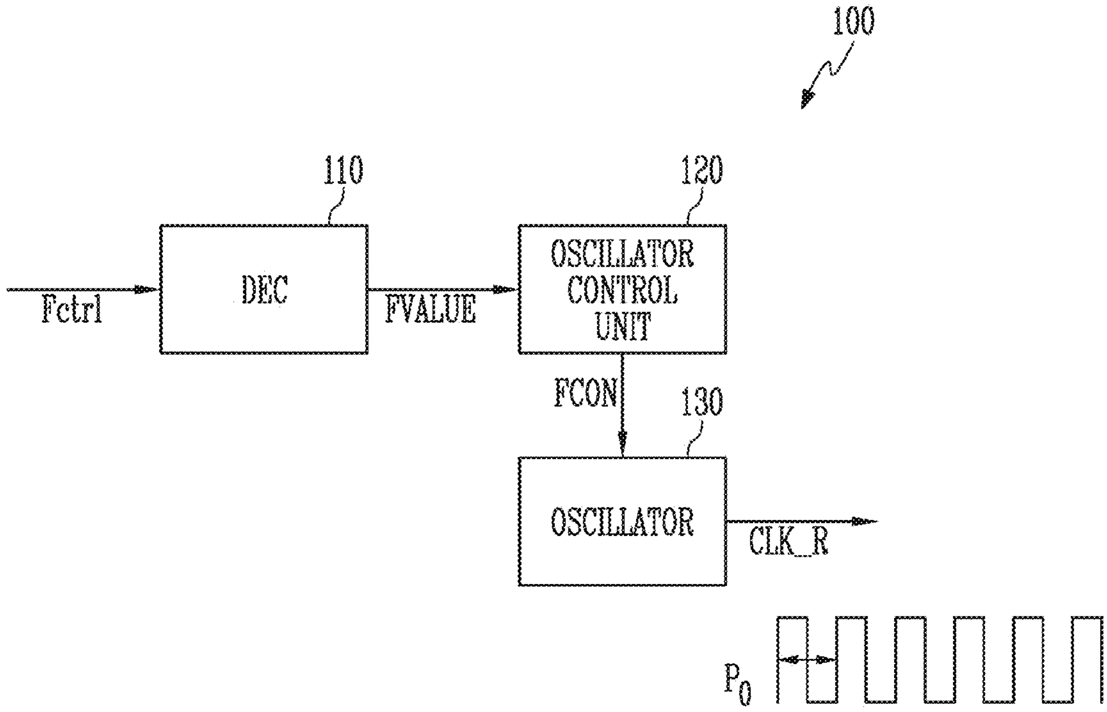
FIG. 2 is a diagram illustrating an embodiment of a display driving circuit included in the display device of FIG. 1.

FIG. 2 is a diagram illustrating an embodiment of a display driving circuit included in the display device of FIG. 1. Specifically, FIG. 2 schematically shows a function of generating a reference clock signal CLK_R by the display driving circuit 100.

Referring to FIGS. 1 and 2, an embodiment of the display driving circuit 100 may include a decoder 110 (or a decoding block, "DEC" in FIG. 2), an oscillator control unit 120 (or an oscillator control block), and an oscillator 130.

The decoder 110 may determine or select a frequency value FVALUE based on the frequency information Fctrl. Here, the frequency value FVALUE may be one of setting values of the oscillator control unit 120. In one embodiment, for example, where the oscillator control unit 120 controls the oscillator 130 by changing a current (or a voltage) applied to the oscillator 130 or a resistance connected to the oscillator 130, the frequency value FVALUE may be one of a plurality of current control values or resistance control values. In one embodiment, for example, where the frequency information Fctrl is a register setting value for the reference clock signal, the decoder 110 may output a setting value (for example, a current control value or a resistance control value) stored in a register in response to the register setting value. In one embodiment, for example, where the frequency information Fctrl is expressed in k bits, the frequency value FVALUE may be one of first to $2^k$-th frequency values, where k is an integer.

The oscillator control unit 120 may output a frequency control signal FCON for changing an amount of a current provided to the oscillator 130 or a resistance value of a resistance connected to the oscillator 130 based on the frequency value FVALUE. The oscillator control unit 120 may include a comparator, an operation circuit, a current source, or the like.

The oscillator 130 may include an amplifier (or a transistor), resistors and a capacitor, and may generate the reference clock signal CLK_R having a specific frequency in response to the frequency control signal FCON or may change the frequency (or a period $P_0$) of the reference clock signal CLK_R. In one embodiment, for example, the frequency of the reference clock signal CLK_R may be in a range of about 1 megahertz (MHz) to about 200 MHz, but the frequency of the reference clock signal CLK_R is not limited thereto.

In such an embodiment, the oscillator 130 may generate the reference clock signal CLK_R having a frequency corresponding to the frequency information Fctrl among a plurality of frequencies.

In an embodiment, as described above, the frequency information Fctrl may be the register setting value for the reference clock signal, but the frequency information Fctrl is not limited thereto. In one alternative embodiment, for example, the frequency information Fctrl may be an external clock signal corresponding to a specific frequency. In such an embodiment, the decoder 110 may count the number of clocks (or the number of pulses) of the external clock signal during a specific time, and output the frequency value FVALUE corresponding to the number of the clocks. In one embodiment, for example, the external clock signal may be proportional to the frequency of the reference clock signal CLK_R, but may have a relatively lower frequency (for example, a frequency of several tens of kilohertz (KHz)) than the frequency (for example, MHz) of the reference clock signal CLK_R.

Figure 3A:
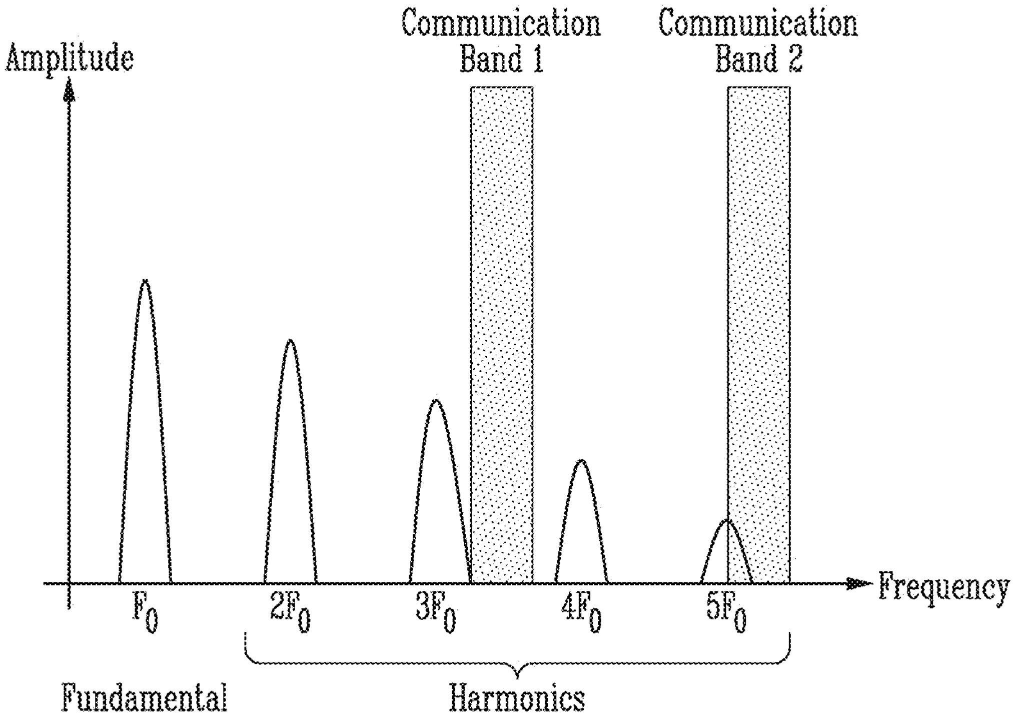
FIGS. 3A and 3B are diagrams illustrating an embodiment of a reference clock signal generated by the display driving circuit of FIG. 2.
Figure 3B:
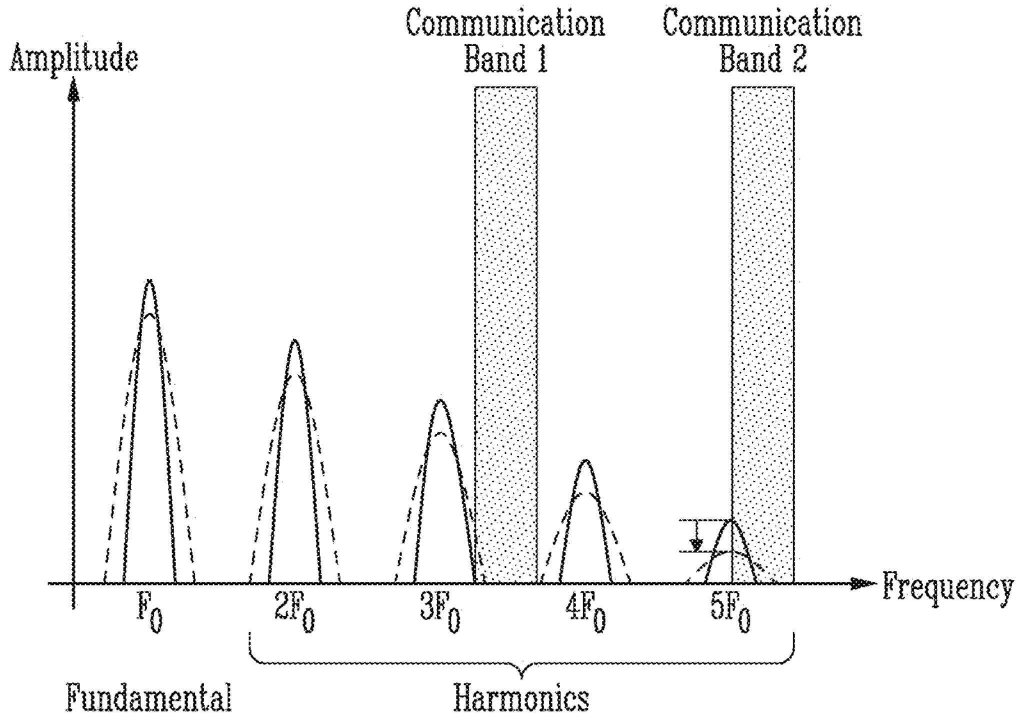

FIGS. 3A and 3B are diagrams illustrating an embodiment of a reference clock signal generated by the display driving circuit of FIG. 2. In FIGS. 3A and 3B, the reference clock signal CLK_R is shown in a frequency domain.

In an embodiment, referring to FIGS. 2 and 3A, the reference clock signal CLK_R may include a fundamental frequency $F_0$ (or a center frequency). The fundamental frequency $F_0$ may mean the frequency of the reference clock signal CLK_R. In such an embodiment, the reference clock signal CLK_R may further include harmonics $2F_0$, $3F_0$, $4F_0$, and $5F_0$ generated by a waveform (that is, a non-sinusoidal signal) of the reference clock signal CLK_R shown in FIG. 2 and a nonlinear circuit of the oscillator 130.

Each of a first communication band "Communication Band 1" and a second communication band "Communication Band 2" may represent the communication band between the application processor 2000 (see FIG. 1) and the external device 3000 (see FIG. 1).

In one embodiment, for example, as shown in FIG. 3A, a part of the harmonic $5F_0$ of the reference clock signal CLK_R may overlap the second communication band. In such an embodiment, the harmonic $5F_0$ of the reference clock signal CLK_R may cause electromagnetic interference in the second communication band, and thus communication sensitivity of the second communication band may be deteriorated.

Referring to FIGS. 2 and 3B, in an embodiment, the oscillator 130 may be implemented as a spread spectrum clock generator. The reference clock signal CLK_R represented by a dotted line may have a spread spectrum compared to the reference clock signal CLK_R represented by a solid line. In such an embodiment, a peak value of the harmonic $5F_0$ of the reference clock signal CLK_R may be decreased according to the spread spectrum. When the peak value of the harmonic $5F_0$ of the reference clock signal CLK_R is less than or equal to a reference level, the deterioration of the communication sensitivity of the second communication band may be alleviated. However, as the overlapping section between the harmonic $5F_0$ of the reference clock signal CLK_R and the second communication band increases, the communication sensitivity of the second communication band may be further deteriorated in some cases.

Therefore, the frequency of the reference clock signal CLK_R (that is, the fundamental frequency $F_0$ and the harmonics $2F_0$, $3F_0$, $4F_0$, and $5F_0$) is desired to be set to avoid the communication band as much as possible. Accordingly, in an embodiment, the application processor 2000 (see FIG. 1) may determine or select the frequency (or the fundamental frequency $F_0$) of the reference clock signal CLK_R, but may control the display driving circuit 100 to generate the reference clock signal CLK_R having an optimal frequency while checking or identifying the communication sensitivity.

However, the control signal (for example, the horizontal synchronization signal, the scan clock signal, and the like) used in the display device 1000 (see FIG. 1) may be set based on the reference clock signal CLK_R, but the control signal (for example, frequency, pulse width) may be changed according to the change in the frequency of the reference clock signal CLK_R, and display quality may be deteriorated due to the change in the control signal. In an embodiment of the invention, the display device 1000 (or the display driving circuit 100) may generate the control signal in consideration of the change in the frequency of the reference clock signal CLK_R to prevent the deterioration of the display quality in a way such that a waveform of the control signal (or one horizontal time or horizontal period "1H") may be kept or maintained substantially constant.

Figures 4, 5:
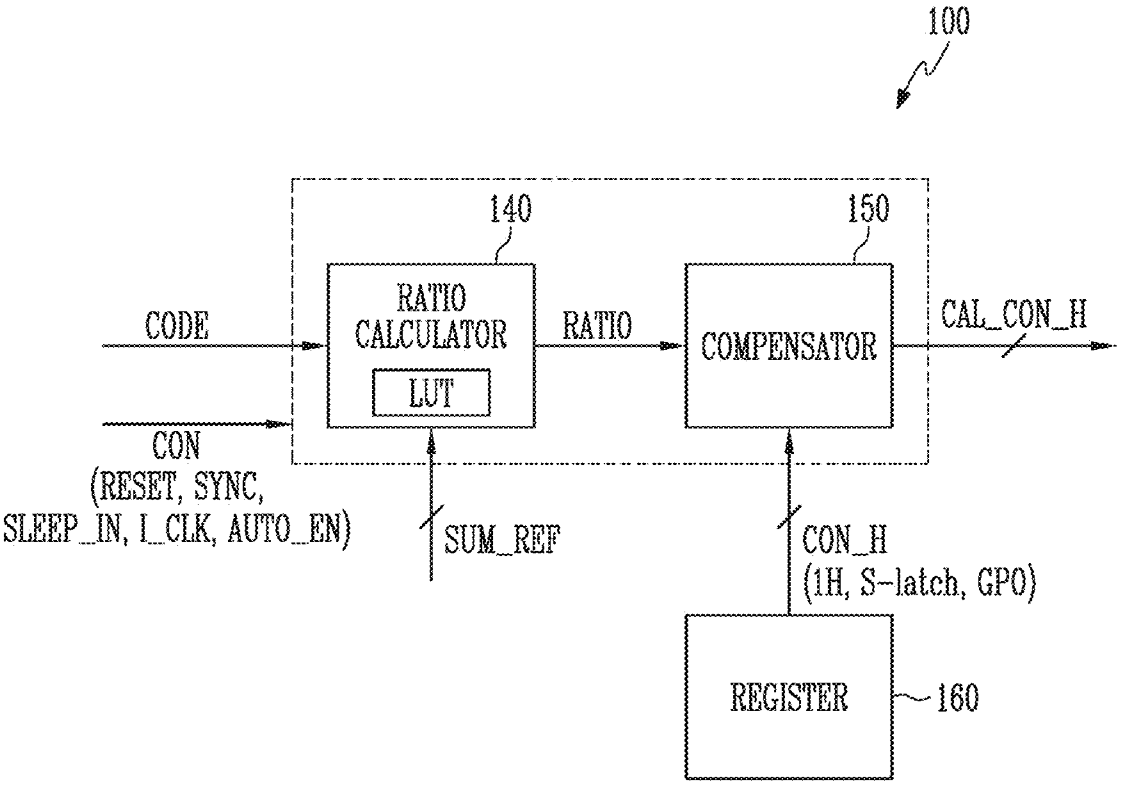
FIG. 4 is a diagram illustrating an embodiment of a display driving circuit included in the display device of FIG. 1.
FIG. 5 is a diagram illustrating an embodiment of a lookup table used in the display driving circuit of FIG. 4.
Figure 6A:
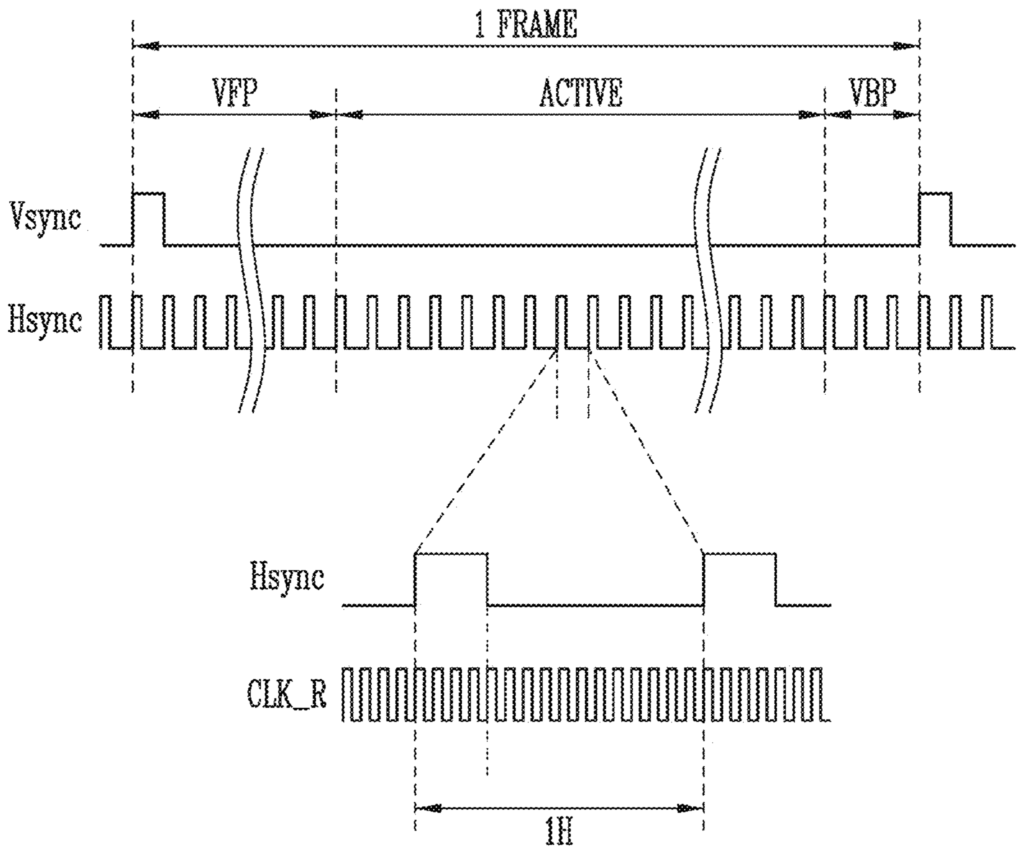
FIG. 6A is a diagram for explaining a signal parameter used in the display driving circuit of FIG. 4.
Figure 6B:
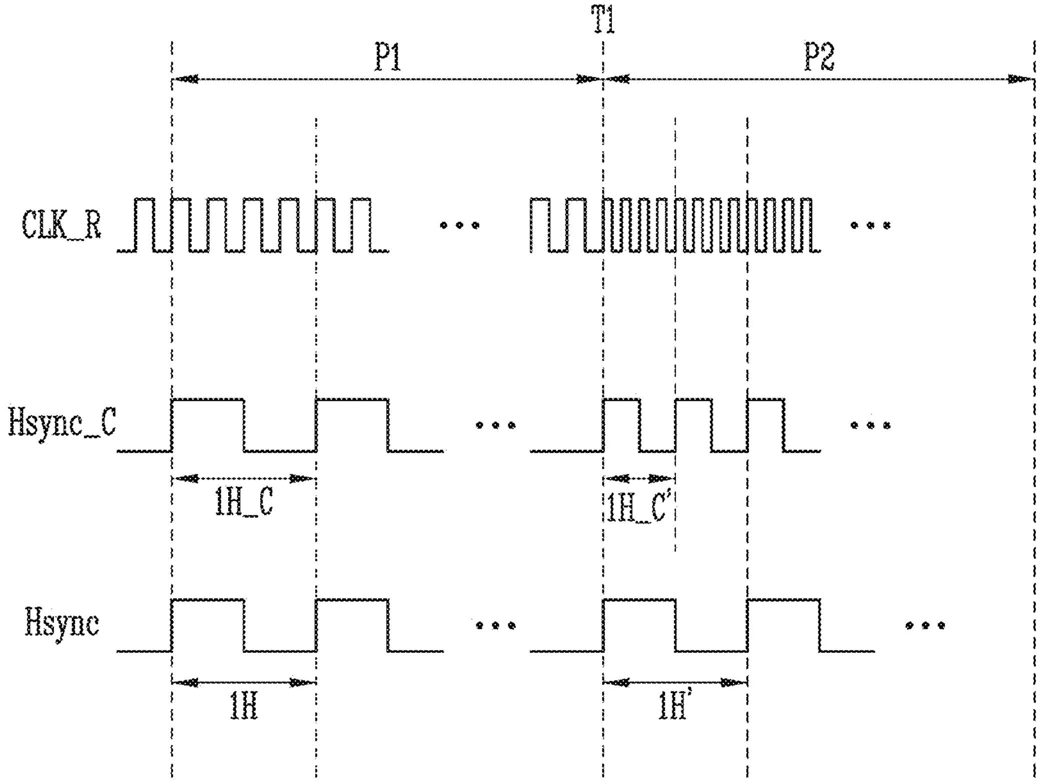
FIG. 6B is a diagram for explaining an operation of the display driving circuit of FIG. 4.

FIG. 4 is a diagram illustrating an embodiment of a display driving circuit included in the display device of FIG. 1. Specifically, FIG. 4 schematically shows a function of fixing the waveform of the control signal (or one horizontal time "1H") by the display driving circuit 100. FIG. 5 is a diagram illustrating an embodiment of a lookup table used in the display driving circuit of FIG. 4. FIG. 6A is a diagram for explaining a signal parameter used in the display driving circuit of FIG. 4. FIG. 6B is a diagram for explaining an operation of the display driving circuit of FIG. 4. FIG. 6C is a diagram for explaining an effect of the operation of the display driving circuit of FIG. 4.

In an embodiment, referring to FIGS. 1 and 4, the display driving circuit 100 (or the control unit) may operate based on a driving control signal CON provided from an outside. In one embodiment, for example, the driving control signal CON may include a reset signal RESET, a synchronization signal SYNC, a sleep-in signal SLEEP_IN, an internal clock signal I_CLK, and an enable signal AUTO_EN. The operation of the display driving circuit 100 may be reset by the reset signal RESET. Operations of the components in the display driving circuit 100 may be synchronized with each other based on the synchronization signal SYNC and the internal clock signal I_CLK, and may be operated in a specific period (for example, at least one frame unit). In an embodiment, when the sleep-in signal SLEEP_IN has a specific value, for example, when the display device 1000 does not display an image, the display driving circuit 100 may not operate. In such an embodiment, the display driving circuit 100 may operate only when the display device 1000 displays an image. The display driving circuit 100 may operate only when the enable signal AUTO_EN is applied, for example, only when a user manually permits the operation of the display driving circuit 100. In such an embodiment, when the user manually stops the operation of the display driving circuit 100, the display driving circuit 100 may not operate.

The display driving circuit 100 may include a ratio calculator 140 (or a ratio calculating block), a compensator 150 (or a compensating block), and a register 160 (or a memory).

The ratio calculator 140 may calculate a ratio RATIO based on a frequency setting value CODE. Here, the frequency setting value CODE may represent a target frequency of the reference clock signal CLK_R. In one embodiment, for example, the frequency setting value CODE may be the frequency information Fctrl and the frequency value FVALUE described with reference to FIG. 2, or may be a value corresponding thereto. In one embodiment, for example, when the frequency of the reference clock signal CLK_R is changed from 100 MHz to 150 MHz based on a first time point T1 (see FIG. 6B), the frequency setting value CODE may be a value corresponding to a frequency of 150 MHz.

In an embodiment, the ratio calculator 140 may calculate the ratio RATIO between a first frequency and a second frequency based on the frequency setting value CODE. Here, the second frequency may be a frequency corresponding to the frequency setting value CODE at a current time point, and the first frequency may be a frequency corresponding to a previous frequency setting value at a previous time point. In one embodiment, for example, the second frequency may be the target frequency (or a frequency after change) of the reference clock signal CLK_R, and the first frequency may be a current frequency (or a frequency before change) of the reference clock signal CLK_R. The first frequency may be stored at the previous time point, and may be updated based on the second frequency after the operation of the ratio calculator 140.

In one embodiment, for example, the first frequency corresponding to the previous frequency setting value at the previous time point may be 100 MHz, and the second frequency corresponding to the frequency setting value CODE at the current time point may be 150 MHz. In such an embodiment, the ratio calculator 140 may calculate the ratio RATIO to be 1.5 (that is, 150 MHz/100 MHz=1.5).

In an embodiment, the ratio calculator 140 may calculate the ratio RATIO using a lookup table LUT in which the ratio RATIO corresponding to the first frequency and the second frequency is defined. In one embodiment, for example, the lookup table LUT may be set based on reference values SUM_REF set corresponding to specific frequencies. Here, the reference values SUM_REF may be provided from the outside (for example, through a user input) during a manufacturing process or setting process of the display device 1000 (see FIG. 1) (or the display driving circuit 100).

Referring to FIG. 5, the lookup table LUT may include ratios between reference values SUM_REF0, SUM_REF1, SUM_REF2, and SUM_REF3. In one embodiment, for example, the reference values SUM_REF0, SUM_REF1, SUM_REF2, and SUM_REF3 arranged in a horizontal direction may correspond to the first frequency, and the reference values SUM_REF0, SUM_REF1, SUM_REF2, and SUM_REF3 arranged in a vertical direction may correspond to the second frequency. In one embodiment, for example, the first reference value SUM_REF1 may correspond to a frequency of 100 MHz and have a first count value REF1 of 100. In such an embodiment, the second reference value SUM_REF2 may correspond to the frequency of 150 MHz and have a second count value REF2 of 150. The count value may correspond to a value obtained by counting the number of clocks (or the number of pulses) of a corresponding signal during a specific time. The count values REF0, REF1, REF2, and REF3 may be proportional to frequencies of corresponding signals, respectively. In one embodiment, for example, when the first frequency is 100 MHz and the second frequency is 150 MHz, the ratio RATIO of 1.5 (that is, REF2/REF1) may be obtained from the lookup table LUT.

The compensator 150 may calculate a changed signal parameter CAL_CON_H (or a corrected signal parameter) by changing a signal parameter CON_H based on the ratio RATIO calculated by the ratio calculator 140. Here, the signal parameter CON_H may be a parameter that defines or represents characteristics of the control signal (or the synchronization signal) based on the reference clock signal CLK_R, and may be stored in advance in the register 160. In one embodiment, for example, the signal parameter CON_H may indicate the number of pulses of the reference clock signal CLK_R included in one period or one pulse of the control signal (or the synchronization signal) (or the number of horizontal widths representing one period). In one embodiment, for example, the signal parameter CON_H of one horizontal time 1H may indicate the number of pulses of the reference clock signal CLK_R included in one period or one pulse of the one horizontal time 1H (or the horizontal synchronization signal). In one embodiment, for example, the signal parameter CON_H of a sampling signal S-latch may indicate the number of pulses of the reference clock signal CLK_R included in one period or one pulse of the sampling signal S-latch. In one embodiment, for example, the signal parameter CON_H of the other control signal GPO may indicate the number of pulses of the reference clock signal CLK_R included in one period of one pulse of the other control signal GPO.

Referring to FIG. 6A, in an embodiment, a period of a horizontal synchronization signal Hsync may be defined as one horizontal time 1H. The signal parameter CON_H of the one horizontal time 1H may indicate the number of pulses (for example, 16) of the reference clock signal CLK_R included in the one horizontal time 1H, the number of pulses (for example, 4) of the reference clock signal CLK_R included in a section in which the horizontal synchronization signal Hsync has a logic high level among the one horizontal time 1H, the number of pulses (for example, 12) of the reference clock signal CLK_R included in a section in which the horizontal synchronization signal Hsync has a logic low level among the one horizontal time 1H, and the like. Hereinafter, for convenience of description, embodiments where the signal parameter CON_H means the signal parameter CON_H for the one horizontal time 1H, in particular, the number of pulses of the reference clock signal CLK_R included in the section in which the horizontal synchronization signal Hsync has the logic high level among the one horizontal time 1H will be described in detail. FIG. 6A merely shows the relationship (or the ratio) between the horizontal synchronization signal Hsync and the reference clock signal CLK_R in one embodiment, and the relationship between the horizontal synchronization signal Hsync and the reference clock signal CLK_R (for example, the number of pulses of the reference clock signal CLK_R included in the one horizontal time 1H) may be variously modified to be different from that of FIG. 6A.

In an embodiment, as shown in FIG. 6A, one frame 1 FRAME may include a first porch section VFP, an active section ACTIVE, and a second porch section VBP. One frame 1 FRAME may be defined by a vertical synchronization signal Vsync. In the active section ACTIVE, the scan signal may be sequentially supplied from the scan driver 20 (see FIG. 1) to the scan lines S1 to Sn, and the data signal (or the data signal effective for displaying image) may be supplied from the data driver 30 to the data lines D1 to Dm. In such an embodiment, the data signal may be supplied from the data driver 30 to the data lines D1 to Dm every one horizontal time 1H. The first porch section VFP may be a section from the end time point of a previous frame to the start time point of the active section ACTIVE. The second porch section VBP may be a section from the end time point of the active section ACTIVE to the start time point of a next frame. In the first porch section VFP and the second porch section VBP, the data driver 30 may not supply the data signal to the data lines D1 to Dm.

Referring back to FIG. 4, the compensator 150 may calculate the changed signal parameter CAL_CON_H by multiplying the ratio RATIO calculated by the ratio calculator 140 by the signal parameter CON_H. In one embodiment, for example, when the ratio RATIO calculated by the ratio calculator 140 is 1.5 and the signal parameter CON_H is 4, the changed signal parameter CAL_CON_H of 6 (that is, 4×1.5) may be calculated by the compensator 150. In such an embodiment, the display driving circuit 100 may generate the horizontal synchronization signal Hsync using the changed signal parameter CAL_CON_H and the reference clock signal CLK_R instead of the signal parameter CON_H. The changed signal parameter CAL_CON_H may be stored in the register 160, or the signal parameter CON_H may be updated based on the changed signal parameter CAL_CON_H.

In FIG. 6B, a comparative horizontal synchronization signal Hsync_C generated in a state in which the ratio calculator 140 and the compensator 150 are not operated according to a comparative embodiment and the horizontal synchronization signal Hsync generated in a state in which the ratio calculator 140 and the compensator 150 are operated according to an embodiment of the invention are shown. The comparative horizontal synchronization signal Hsync_C may be generated based on the reference clock signal CLK_R and the signal parameter CON_H, and the horizontal synchronization signal Hsync may be generated based on the reference clock signal CLK_R and the changed signal parameter CAL_CON_H (a corrected signal parameter or an updated signal parameter).

The frequency of the reference clock signal CLK_R may be changed at the first time point T1. In one embodiment, for example, the second frequency (for example, 150 MHz) of the reference clock signal CLK_R in a second section P2 may be changed to twice the first frequency (for example, 75 MHz) of the reference clock signal CLK_R in a first section P1.

One horizontal time 1H_C' of the comparative horizontal synchronization signal Hsync_C in the second section P2 may be reduced to half of one horizontal time 1H_C of the comparative horizontality synchronization signal Hsync_C in the first section P1 by reflecting the change in the frequency of the reference clock signal CLK_R as it is.

In an embodiment of the invention, since one horizontal time 1H' of the horizontal synchronization signal Hsync in the second section P2 is generated based on the changed signal parameter CAL_CON_H reflecting the change in the frequency of the reference clock signal CLK_R (for example, the signal parameter having a value changed from 4 to 8), the one horizontal time 1H' of the horizontal synchronization signal Hsync in the second section P2 may be substantially the same as the one horizontal time 1H of the horizontal synchronization signal Hsync in the first section P1.

FIG. 6B shows a case where the amount of change in the frequency of the reference clock signal CLK_R is substantially large for convenience of illustration and description. Another change in the frequency of the reference clock signal CLK_R and an effect obtained therefrom will be described with reference to FIG. 6C.

Referring to FIG. 6C, a case in which the frequency of the reference clock signal CLK_R is changed from 164.9 MHz to 170.5 MHz will be described below.

In a case where the function of the display driving circuit 100 of FIG. 4 (that is, the function of fixing one horizontal time 1H) is not applied (Function off in FIG. 6C), a frequency of one horizontal time 1H may be increased by about 12.9 KHz from 392.2 KHz to 405.1 KHz. In this case, the width of one horizontal time 1H may be reduced. In this case, the luminance for 255 grayscales (for example, a full white image) may be increased by about 13 nits from 537.3 nits to 550.3 nits. The amount of change in luminance for 72 grayscales may be about 2.07 nits.

In a case where the function of the display driving circuit 100 of FIG. 4 (that is, the function of fixing one horizontal time 1H) is applied (Function on in FIG. 6C), the frequency of one horizontal time 1H may be increased by about 0.2 KHz from 392.2 KHz to 392.4 KHz, and the one horizontal time 1H may hardly change or be maintained substantially (approximately or effectively) constant. A minimum unit of the signal parameter CON_H may be one period of the reference clock signal CLK_R, and the amount of change in frequency by 0.2 KHz may be due to the minimum unit. In this case, the amount of change in luminance for 255 grayscales may be about 2.07 nits, and the amount of change in luminance for 72 grayscales may be about 0.1 nits.

In an embodiment, as described above, the display driving circuit 100 may fix the one horizontal time 1H or maintain the one horizontal time 1H to be substantially constant, prevent changes in waveforms of the control signals, and drive the display device 1000 under a certain condition by changing or compensating the signal parameter CON_H (or the signal parameter CAL_CON_H of one horizontal time 1H, which is a reference of the control signals) based on the frequency of the reference clock signal CLK_R. Accordingly, the deterioration of display quality (for example, a change in luminance) may be effectively prevented.

Figure 7A:
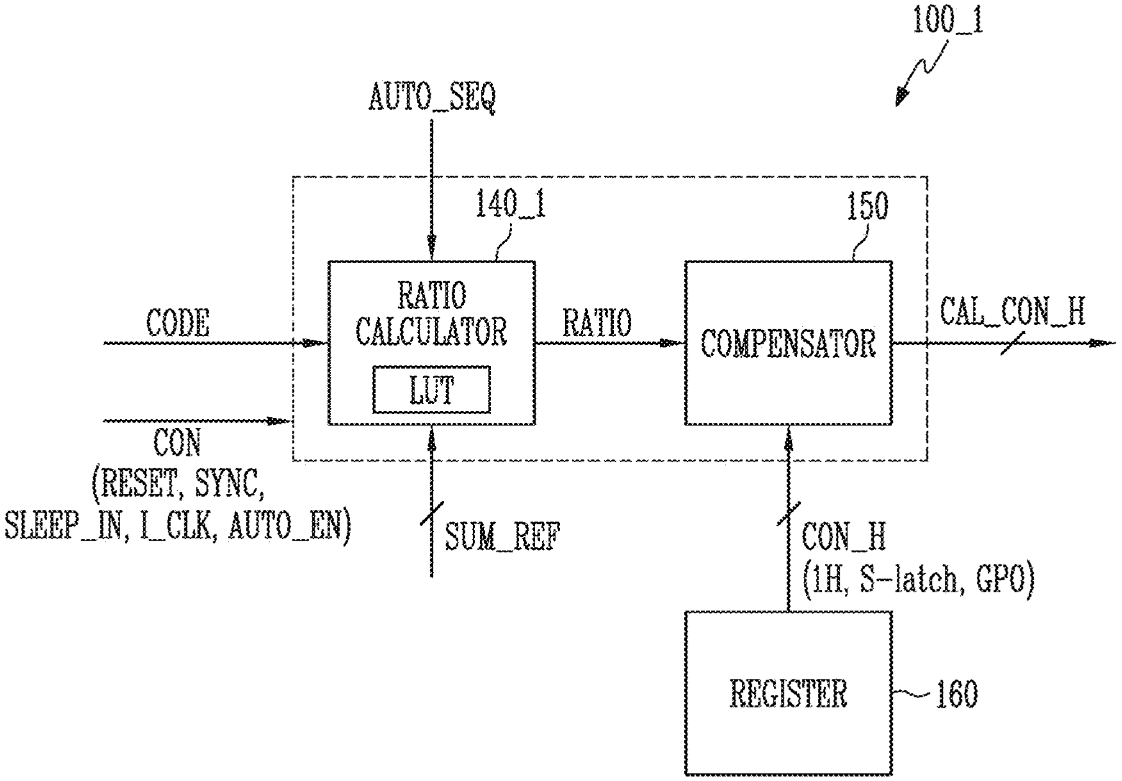
FIGS. 7A and 7B are diagrams illustrating alternative embodiments of the display driving circuit included in the display device of FIG. 1.
Figure 7B:
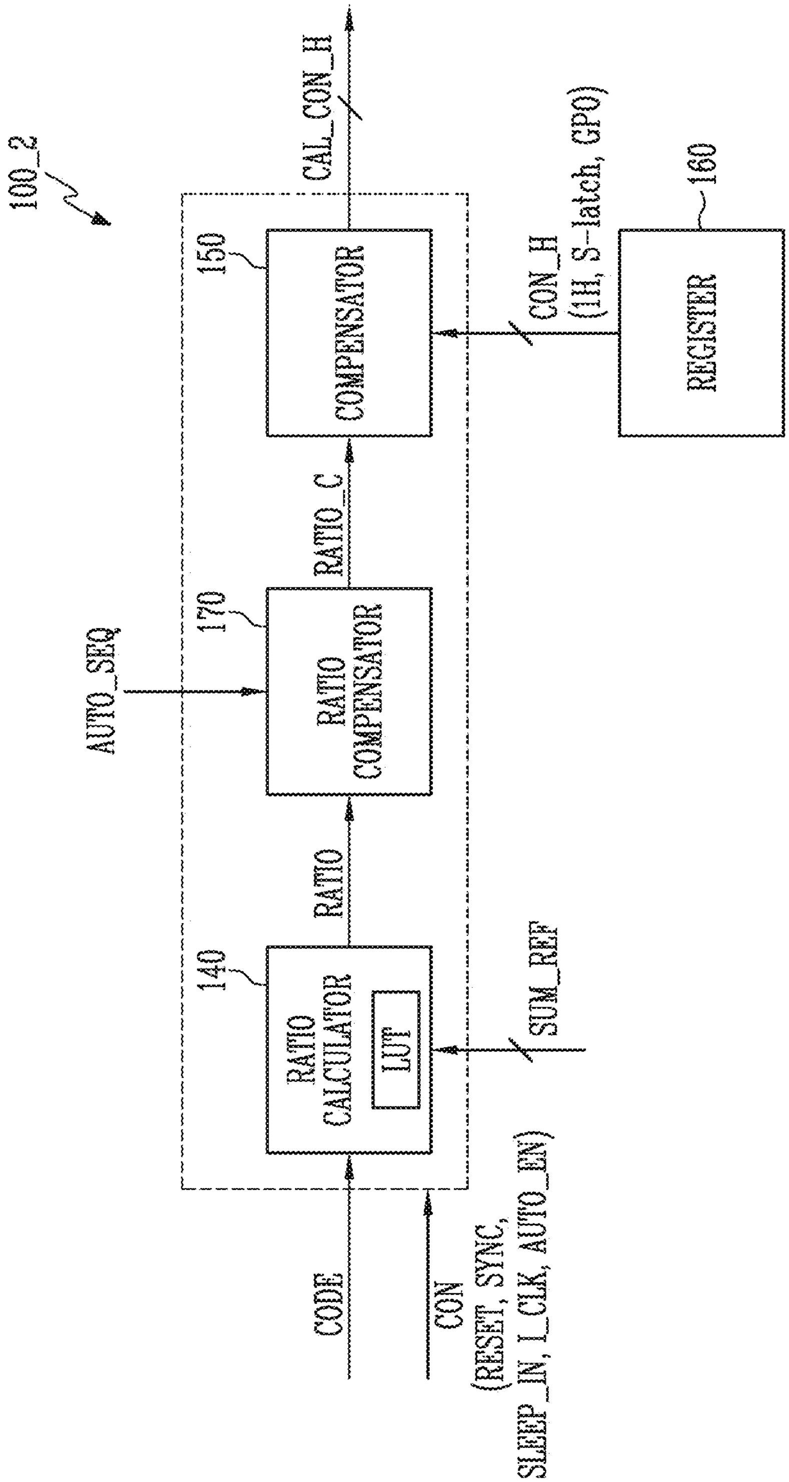
Figure 8:
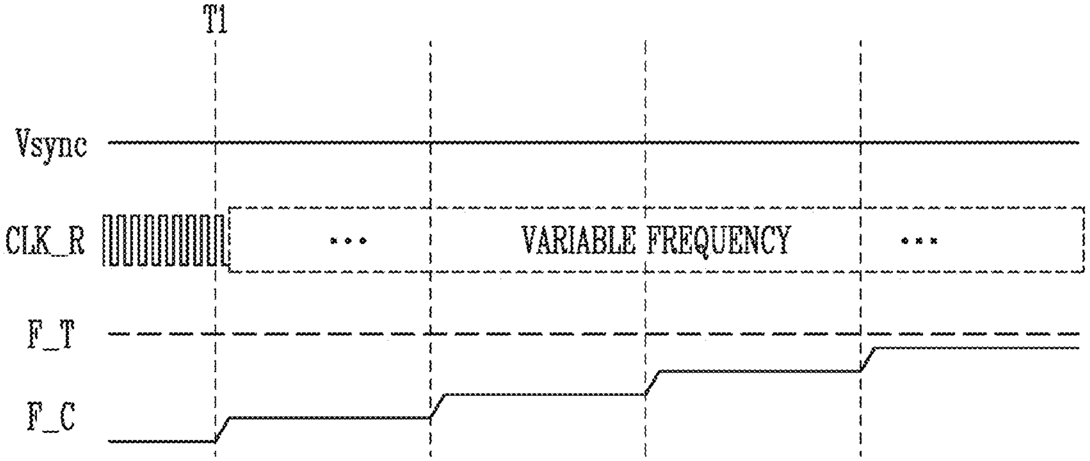
FIG. 8 is a diagram for explaining sequence information used in the display driving circuit of FIGS. 7A and 7B.

FIGS. 7A and 7B are diagrams illustrating alternative embodiments of the display driving circuit included in the display device of FIG. 1. FIG. 8 is a diagram for explaining sequence information used in the display driving circuit of FIGS. 7A and 7B.

First, referring to FIGS. 1, 4 and 7A, the embodiment of a display driving circuit 100_1 of FIG. 7A may be substantially the same as or similar to the embodiment of the display driving circuit 100 of FIG. 4 except for a ratio calculator 140_1, and thus, any repetitive detailed descriptions of the same or like elements of the embodiment of FIG. 7A as those of the embodiment of FIG. 4 will be omitted or simplified.

In an embodiment, the ratio calculator 140_1 may calculate the ratio RATIO based on sequence information AUTO_SEQ in addition to the frequency setting value CODE. Here, the sequence information AUTO_SEQ may be a set value generated based on the change in the frequency of the reference clock signal CLK_R, or previously set for sequential operations in the display driving circuit 100. In one embodiment, for example, the sequence information AUTO_SEQ may indicate sequential operations of the oscillator 130 (see FIG. 2). In one alternative embodiment, for example, the sequence information AUTO_SEQ may indicate a sequential change in the reference clock signal CLK_R output from the oscillator 130 based on a frequency change command.

Referring to FIGS. 2 and 8, for example, at the first time point T1 or in a frame before the first time point T1, the frequency information Fctrl (see FIG. 2) for changing the frequency of the reference clock signal CLK_R to a target frequency F_T may be provided to the display driving circuit 100.

In an embodiment, as described with reference to FIG. 2, the display driving circuit 100 may control the operation of the oscillator 130 by changing the current or resistance. In such an embodiment, the frequency of the reference clock signal CLK_R may be changed in the porch section to prevent the change in the one horizontal time 1H in the active section ACTIVE (see FIG. 6A). Therefore, several steps (or several frequencies) may be performed to track the frequency of the reference clock signal CLK_R to the target frequency F_T. In one embodiment, for example, as shown in FIG. 8, a current frequency F_C of the reference clock signal CLK_R may be gradually changed up to the target frequency F_T during at least 4 frames.

If the ratio calculator 140_1 calculates the ratio RATIO based only on the frequency setting value CODE (that is, the target frequency F_T), an error may occur in the ratio RATIO as much as the difference between the current frequency F_C and the target frequency F_T, and the one horizontal time 1H may be changed in response to the changed signal parameter CAL_CON_H in which the error is reflected.

Accordingly, in an embodiment, the ratio calculator 140_1 may calculate the ratio RATIO in consideration of operations for changing the frequency of the reference clock signal CLK_R in response to a frequency change request (that is, the frequency information Fctrl).

In one embodiment, for example, the sequence information AUTO_SEQ may correspond to the current frequency F_C of the reference clock signal CLK_R (or the frequency control signal FCON, see FIG. 2), and the sequence information AUTO_SEQ may be set in advance based on a change in characteristic of the current frequency F_C.

In such an embodiment, the ratio calculator 140_1 may compensate the ratio RATIO by a compensation ratio of the current frequency F_C with respect to the frequency setting value CODE (or the target frequency F_T). In such an embodiment, the ratio calculator 140_1 may compensate the ratio obtained from the lookup table LUT by the compensated ratio based on the frequency setting value CODE. The ratio calculator 140_1 may gradually change the ratio RATIO to a target ratio (that is, a ratio corresponding to the target frequency F_T) in response to the gradual change in the current frequency F_C as shown in FIG. 8.

FIG. 7A shows an embodiment in which the ratio calculator 140_1 compensates for the ratio RATIO, but the invention is not limited thereto. Alternatively, as shown in FIG. 7B, the operation of compensating the ratio RATIO may be performed in a ratio compensator 170 that is distinguished from the ratio calculator 140.

Referring to FIGS. 1, 4, 7A and 7B, the embodiment of a display driving circuit 100_2 of FIG. 7B may be substantially the same as or similar to the embodiment of the display driving circuit 100 of FIG. 4 except for the ratio compensator 170.

The ratio compensator 170 (or a ratio compensating block) may calculate a compensated ratio RATIO_C by compensating the ratio RATIO generated by the ratio calculator 140 based on the sequence information AUTO_SEQ. Since an operation of the ratio compensator 170 is substantially the same as or similar to the operation of compensating the ratio in the ratio calculator 140_1 of FIG. 7A, any repetitive detailed descriptions thereof will be omitted.

In such an embodiment, the compensator 150 may change or compensate the signal parameter CON_H based on the compensated ratio RATIO_C.

In an embodiment, as described above, the display driving circuit 100_1 or 100_2 may compensate for the ratio RATIO (and the signal parameter CAL_CON_H) in consideration of operations generated (or predicted) in a process of changing the frequency of the reference clock signal CLK_R. Therefore, the change in one horizontal time 1H may be effectively prevented in the process of changing the reference clock signal CLK_R.

Figure 9:
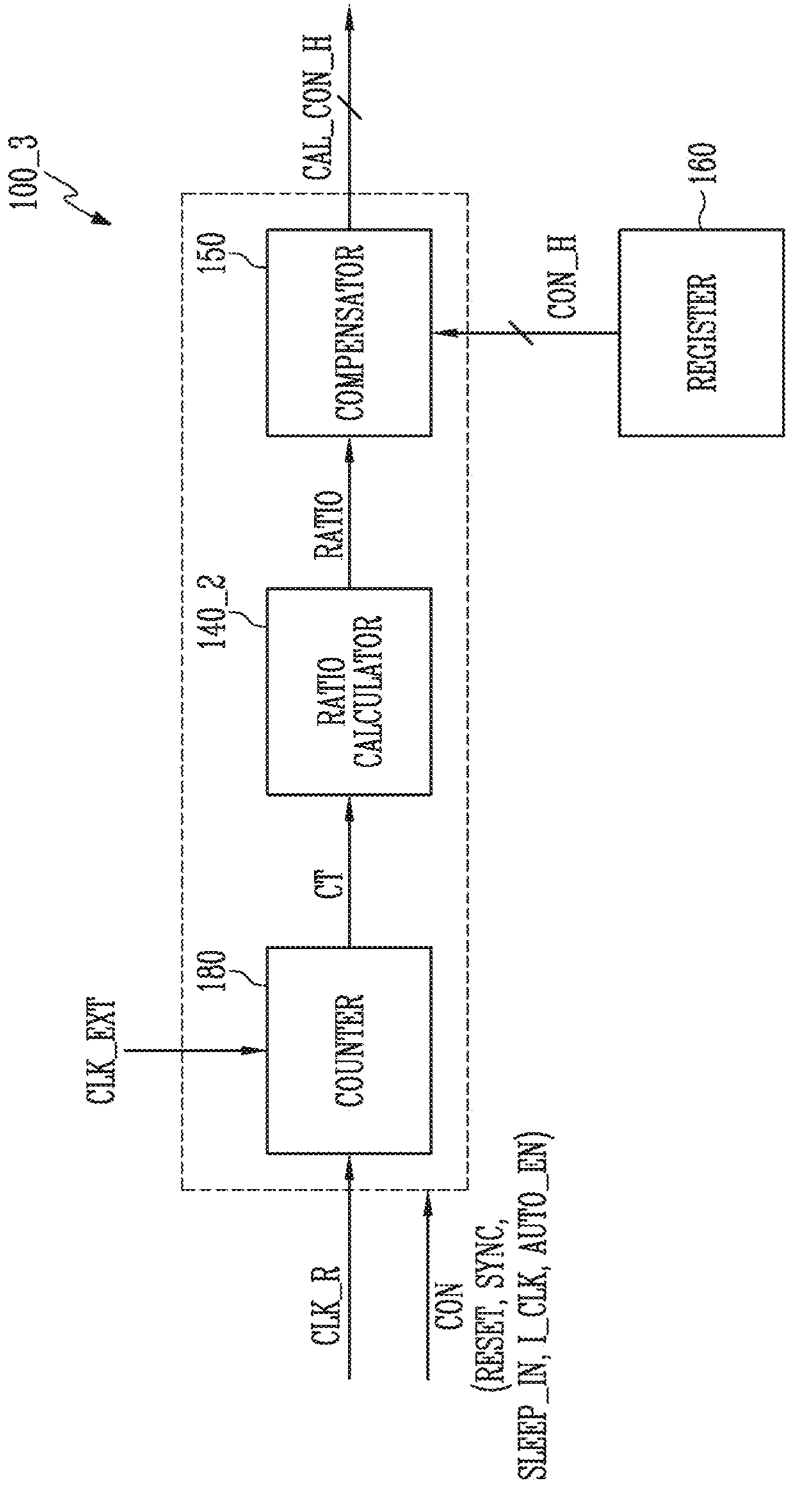
FIG. 9 is a diagram illustrating another alternative embodiment of the display driving circuit included in the display device of FIG. 1.

FIG. 9 is a diagram illustrating an alternative embodiment of the display driving circuit included in the display device of FIG. 1.

Referring to FIGS. 1, 4 and 9, the embodiment of a display driving circuit 100_3 of FIG. 9 may be substantially the same as or similar to the embodiment of the display driving circuit 100 of FIG. 4 except for a counter 180 and a ratio calculator 140_2, and thus any repetitive detailed descriptions of the same or like elements of the embodiment of FIG. 9 as those of the embodiment of FIG. 4 will be omitted.

In an embodiment, as shown in FIG. 9, the display driving circuit 100_3 may further include the counter 180 (or a counting block), and may change the signal parameter CON_H based on an external clock signal CLK_EXT and the reference clock signal CLK_R instead of the frequency setting value CODE (see FIG. 4).

The counter 180 may calculate a count value CT by counting the reference clock signal CLK_R based on the external clock signal CLK_EXT. In one embodiment, for example, the counter 180 may receive the external clock signal CLK_EXT as an enable signal, and may calculate the count value CT by counting the number of clocks or pulses of the reference clock signal CLK_R in a section in which the external clock signal CLK_EXT has a specific level. The external clock signal CLK_EXT may have a frequency relatively lower than the frequency of the reference clock signal CLK_R (for example, a frequency of several tens of KHz).

The ratio calculator 140_2 may calculate the ratio RATIO based on the count value CT.

In an embodiment, the ratio calculator 140_2 may calculate the ratio RATIO between a first count value (a reference count value or the number of reference clocks) and a second count value (or the number of calculated clocks). Here, the second count value may be a value calculated by counting the reference clock signal CLK_R at a current time point, and the first frequency may be a value previously calculated by counting the reference clock signal CLK_R at a previous time point. The second count value may be stored at the previous time point, and the first count value may be updated based on the second count value after the operation of the ratio calculator 140_2.

In one embodiment, for example, the first count value of the reference clock signal CLK_R having the frequency of 100 MHz at the previous time point may be 100, and the second count value of the reference clock signal CLK_R having the frequency of 150 MHz at the current time point may be 150. In this case, the ratio calculator 140_2 may calculate the ratio RATIO of 1.5 (that is, 150 MHz/100 MHz=1.5). That is, the ratio RATIO may be the same as or similar to the ratio RATIO described with reference to FIG. 4. As described with reference to FIG. 8, when the frequency of the reference clock signal CLK_R gradually changes, the ratio calculated by the ratio calculator 140_2 may be the same as or similar to the compensated ratio RATIO_C described with reference to FIG. 7B.

The compensator 150 may change or compensate the signal parameter CON_H based on the ratio RATIO.

In such an embodiment, as described above, the display driving circuit 100_3 may compensate the signal parameter CAL_CON_H by counting (or detecting) the reference clock signal CLK_R in real time. Therefore, the change in one horizontal time 1H may be effectively prevented in the process of changing the reference clock signal CLK_R.

Figure 10:
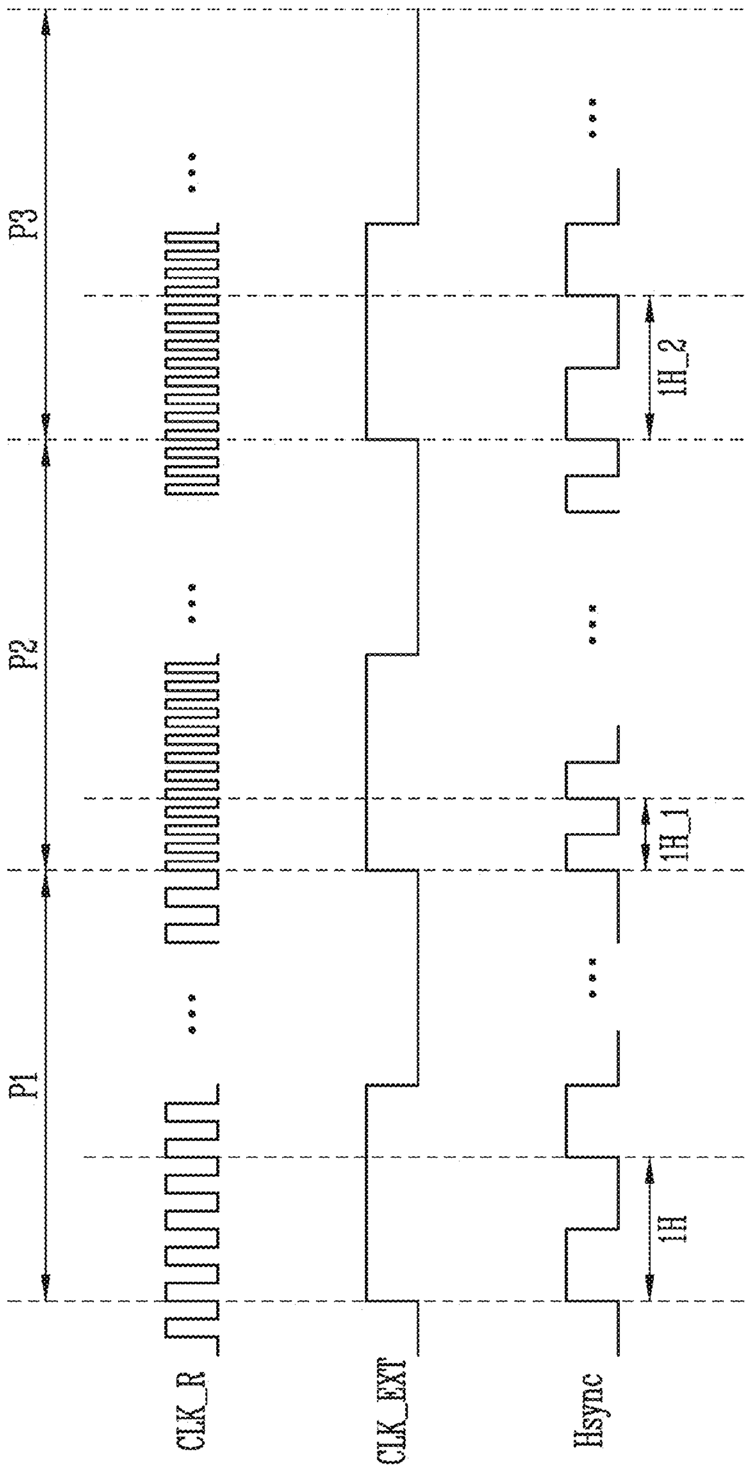
FIG. 10 is a diagram for explaining an operation of the display driving circuit of FIG. 9.

FIG. 10 is a diagram for explaining an operation of the display driving circuit of FIG. 9.

Referring to FIGS. 9 and 10, the counter 180 may count the reference clock signal CLK_R in response to the external clock signal CLK_EXT of a logic high level. That is, during a section in which the external clock signal CLK_EXT has a logic low level, the counter 180 may count the number of clocks of the reference clock signal CLK_R. Thereafter, in a section in which the external clock signal CLK_EXT has the logic low level, the ratio calculator 140_2 may calculate the ratio RATIO, and the compensator 150 may change or compensate the signal parameter CON_H based on the ratio RATIO. The changed signal parameter CAL_CON_H may be applied to a next section.

Accordingly, the count value CT of 6 may be calculated in the first section P1. It is assumed that the count value CT calculated in a previous section of the first section P1 is 6, and the signal parameter CON_H of the horizontal synchronization signal Hsync (or one horizontal time 1H) is 4.

As shown in FIG. 10, the frequency of the reference clock signal CLK_R in the second section P2 may increase twice as high as the frequency of the reference clock signal CLK_R in the first section P1.

However, according to the count value CT calculated in the first section P 1, the ratio RATIO may be 1, and the changed signal parameter CAL_CON_H calculated based on the ratio RATIO in the compensator 150 may be 4. Accordingly, one horizontal time 1H_1 in the second section P2 may be reduced to half of the one horizontal time 1H in the first section P1.

In the second section P2, the counter 180 may count the reference clock signal CLK_R in response to the external clock signal CLK_EXT of the logic high level, and the count value CT of 12 may be calculated. Based on the count value CT of 6 calculated in the first section P1 and the count value CT of 12 calculated in the second section P2, the ratio calculator 140_2 may calculate the ratio RATIO of 2, and the compensator 150 may calculate the changed signal parameter CAL_CON_H of 8 based on the ratio RATIO of 2.

Thereafter, in a third section P3, since the changed signal parameter CAL_CON_H is 8, one horizontal time 1H_2 in the third section P3 may be changed to be the same as the one horizontal time 1H in the first section P1.

In such an embodiment, since the signal parameter CAL_CON_H is changed by counting (or sensing) the external clock signal CLK_EXT, the compensation of the signal parameter CAL_CON_H may be delayed by at least one period of the external clock signal CLK_EXT, and one horizontal time 1H may be changed temporarily.

However, as described above with reference to FIG. 8, since the frequency of the reference clock signal CLK_R is changed in the porch section (that is, the second porch section VBP or the first porch section VBP) to prevent the change in one horizontal time 1H in the active section ACTIVE (see FIG. 6A), a section in which one horizontal time 1H is temporarily changed may also be set to be included in the porch section. In one embodiment, for example, at least the second section P2 among the first to third sections P1, P2, and P3 may be included in the porch section. In this case, the temporary change in the reference clock signal CLK_R does not affect the supply of the scan signal and/or the data signal, and thus the display quality may not be deteriorated.

Figure 11:
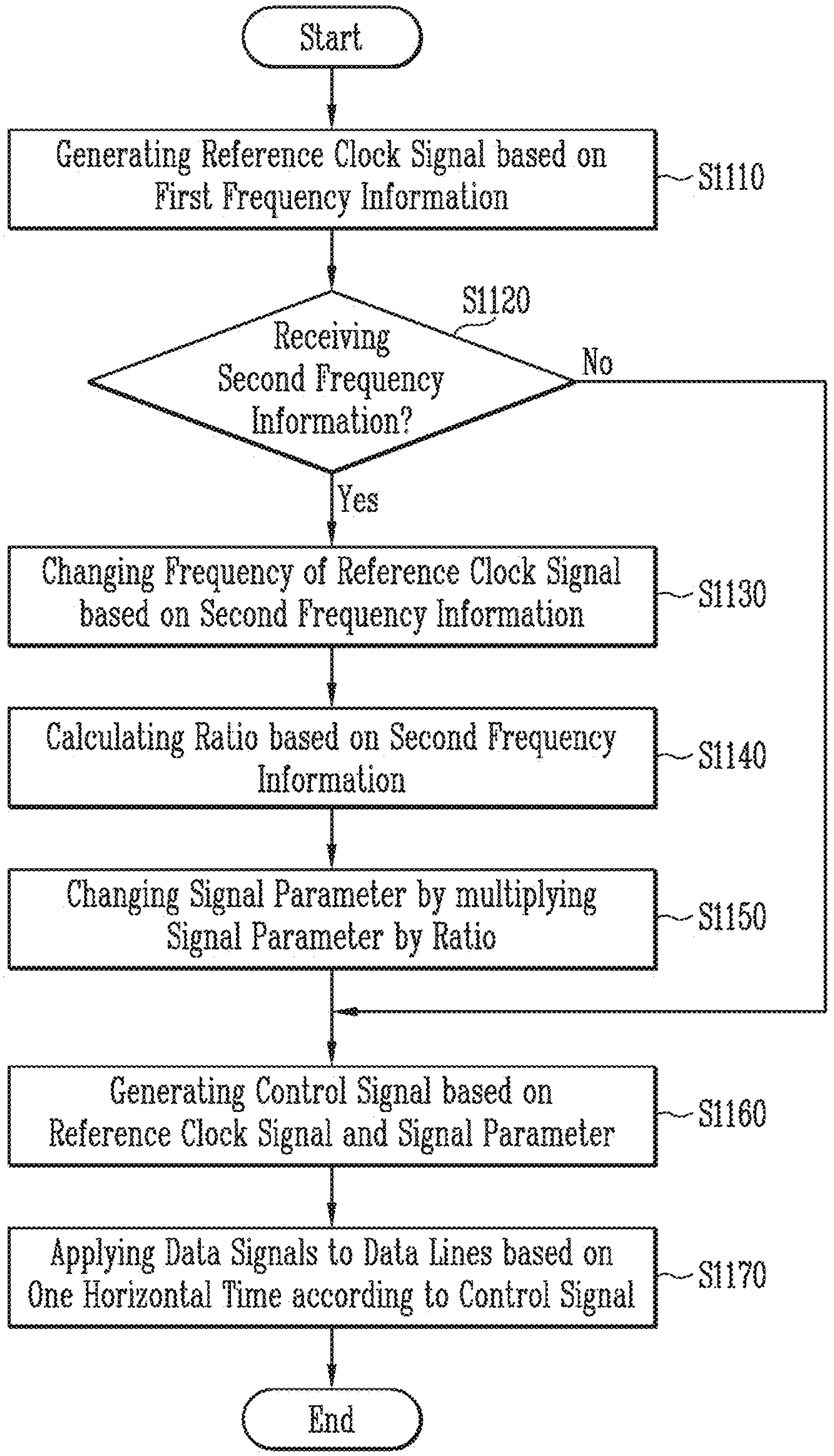
FIG. 11 is a flowchart illustrating a method of driving a display device according to an embodiment of the invention.

FIG. 11 is a flowchart illustrating a method of driving a display device according to an embodiment of the invention.

Referring to FIGS. 1, 2, 4 and 11, an embodiment of the method of FIG. 11 may be performed in the display device 1000 of FIG. 1 (or a device including the display device 1000 and the application processor 2000).

An embodiment of the method of FIG. 11 may include generating the reference clock signal CLK_R based on first frequency information (S1110). Here, the first frequency information may be the frequency information Fctrl provided from the application processor 2000 to the display device 1000 at the first time point. As described above with reference to FIG. 2, the display driving circuit 100 may generate the reference clock signal CLK_R having the frequency corresponding to the frequency information Fctrl.

When the display device 1000 receives second frequency information (S1120), the method of FIG. 11 may perform changing the frequency of the reference clock signal CLK_R based on the second frequency information (S1130). Here, the second frequency information may be the frequency information Fctrl provided from the application processor 2000 to the display device 1000 at the second time point. As described above with reference to FIG. 2, the display driving circuit 100 may change the frequency of the reference clock signal CLK_R to the frequency corresponding to the frequency information Fctrl.

The method of FIG. 11 may further include calculating the ratio RATIO based on the second frequency information (S1140). As described above with reference to FIG. 4, the display driving circuit 100 (or the ratio calculator 140) may calculate the ratio RATIO using the second frequency information and the lookup table LUT.

According to an embodiment, as described above with reference to FIGS. 7A and 7B, the method of FIG. 11 may further include compensating for the ratio RATIO or calculate the compensated ratio RATIO_C based on the sequence information AUTO_SEQ.

The method of FIG. 11 may include changing or compensating the signal parameter CON_H by multiplying the signal parameter CON_H by the ratio RATIO (S1150). As described above with reference to FIG. 4, the display driving circuit 100 (or the compensator 150) may calculate the changed signal parameter CAL_CON_H by changing or compensating the signal parameter CON_H based on the ratio RATIO.

In such an embodiment, the method of FIG. 11 may include generating the control signal (or the synchronization signal) based on the reference clock signal CLK_R and the signal parameter CON_H (S1160). When the signal parameter CON_H is changed, the changed signal parameter CAL_CON_H may be used. As described above with reference to FIGS. 1 and 4, the display driving circuit 100 may generate the control signal such as the horizontal synchronization signal Hsync, the sampling signal S-latch, and the like based on the reference clock signal CLK_R and the signal parameter CON_H.

As described above with reference to FIG. 4, the display driving circuit 100 may fix one horizontal time 1H or maintain one horizontal time 1H to be substantially constant, prevent the change in waveform of the control signal, and drive the display device 1000 under a certain condition by changing or compensating the signal parameter CON_H based on the frequency of the reference clock signal CLK_R.

The method of FIG. 11 may further include applying the data signal to the data lines D1 to Dm based on the one horizontal time 1H according to the control signal (S1170). As described above with reference to FIG. 6A, the data driver 30 may apply the data signal to the data lines D1 to Dm every one horizontal time 1H.

Figure 12:
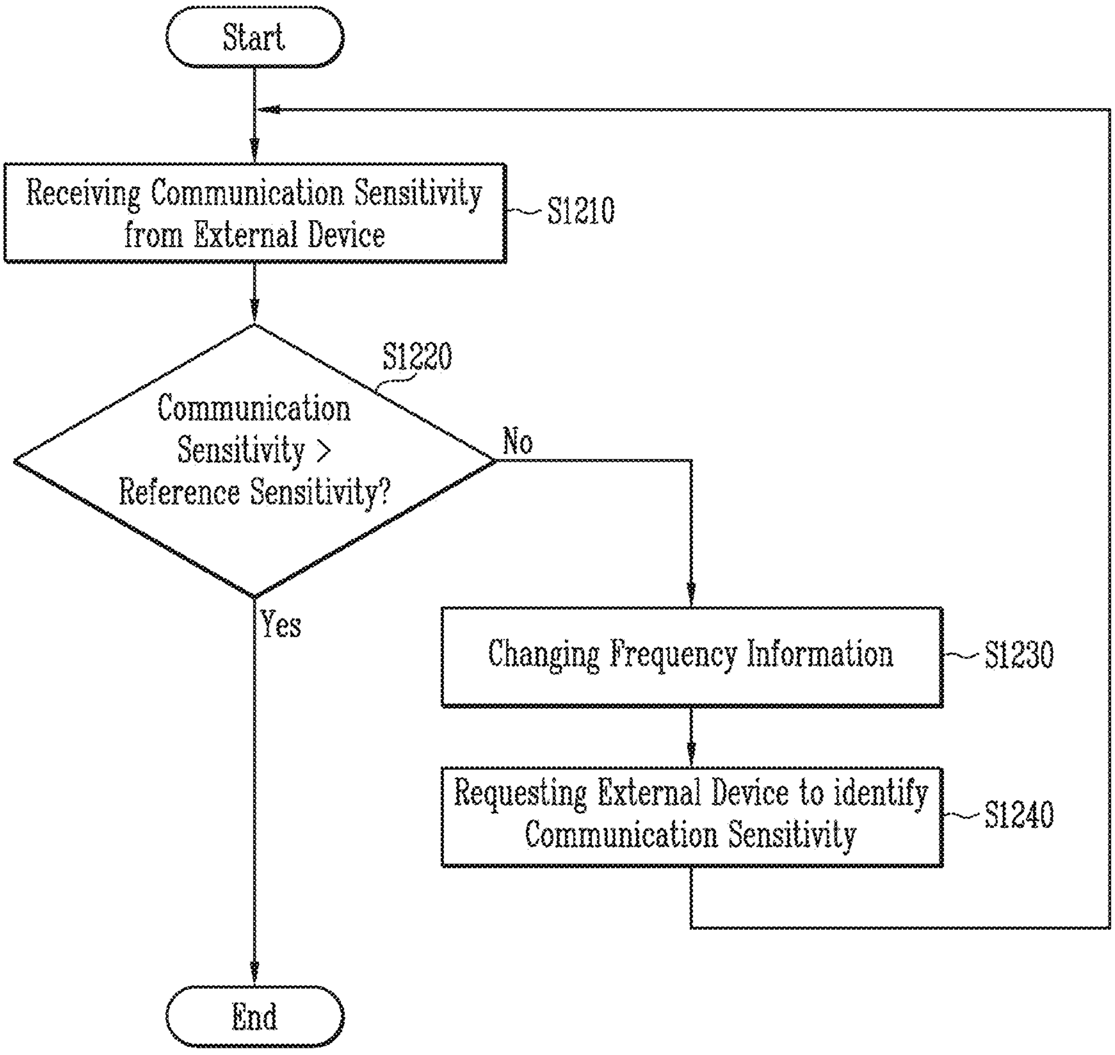
FIG. 12 is a flowchart illustrating a process of receiving second information included in the method of FIG. 11.

FIG. 12 is a flowchart illustrating a process of receiving second information included in the method of FIG. 11.

Referring to FIGS. 1, 11 and 12, the application processor 2000 may receive communication sensitivity from the external device 3000 (S1210). In one embodiment, for example, the application processor 2000 may receive a message or information on the communication sensitivity (or reception sensitivity) from the external device 3000 through an antenna.

When the communication sensitivity is lower than a reference sensitivity, that is, when the communication sensitivity is out of the specification (S1220), the application processor 2000 may change the frequency information Fctrl (S1230). As described above with reference to FIGS. 3A and 3B, the frequency information Fctrl may be changed in a way such that the fundamental frequency and harmonics of the reference clock signal CLK_R are set to avoid the communication band. In one embodiment, for example, the application processor 2000 may transmit a message for changing the current frequency of the reference clock signal CLK_R to another frequency to the display device 1000.

After the frequency of the reference clock signal CLK_R is changed, the application processor 2000 may request the external device 3000 to identify the communication sensitivity (S1240). That is, the application processor 2000 may request the external device 3000 to reply to whether the communication sensitivity meets the specification or is satisfactory.

The application processor 2000 may repeat the process of receiving the communication sensitivity (S1210), the process of changing the frequency information Fctrl (S1230), and the process of requesting identification of the communication sensitivity (S1240) until the reference clock signal CLK_R having the optimal frequency is generated.

Figure 13:
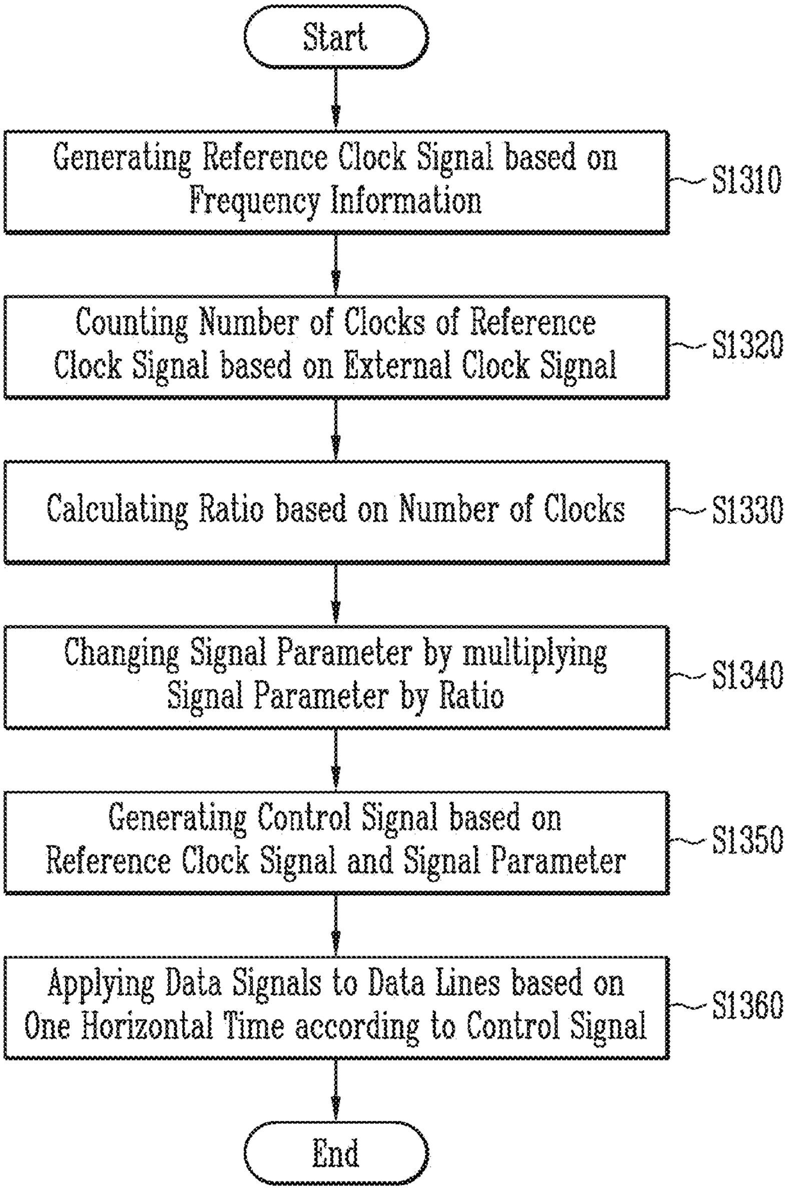
FIG. 13 is a flowchart illustrating a method of driving a display device according to an alternative embodiment of the invention.

FIG. 13 is a flowchart illustrating a method of driving a display device according to an alternative embodiment of the invention.

Referring to FIGS. 1, 2, 9 and 11, an embodiment of the method of FIG. 13 may be performed in the display device 1000 of FIG. 1 (or a device including the display device 1000 and the application processor 2000).

The method of FIG. 13 may include generating the reference clock signal CLK_R based on the frequency information Fctrl (S1310).

The method of FIG. 13 may further include counting the number of clocks of the reference clock signal based on the external clock signal CLK_EXT (S1320). As described above with reference to FIG. 9, the display driving circuit 100 (or the counter 180) may calculate the count value CT by counting the number of clocks or pulses of the reference clock signal CLK_R in a section in which the external clock signal CLK_EXT has a specific level.

The method of FIG. 13 may further include calculating the ratio RATIO based on the number of counted clocks (S1330). As described above with reference to FIG. 9, the display driving circuit 100 (or the ratio calculator 140_2) may calculate the ratio RATIO based on the count value CT.

In such an embodiment, as described above with reference to FIG. 11, the method of FIG. 13 may further include changing or compensating the signal parameter CON_H by multiplying the signal parameter CON_H by the ratio RATIO (S1340), generate the control signal (or the synchronization signal) based on the reference clock signal CLK_R and the signal parameter CON_H (S1350), and applying the data signal to the data lines D1 to Dm based on one horizontal time 1H according to the control signal (S1360).

Embodiments of a display device and a method of driving the display device according to the invention may change or compensate the signal parameter (or the signal parameter defining one horizontal time 1H, which is a reference of the control signals based on the reference clock signal) based on the frequency of the reference clock signal. Therefore, one horizontal time may be fixed or maintained to be substantially (approximately or effectively) constant, and the frequency of the control signal may be maintained substantially constant. Accordingly, the display device may be driven under a certain condition, and the deterioration of display quality such as the change in luminance may be effectively prevented.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

an oscillator which generates a reference clock signal having a frequency corresponding to frequency information provided from an outside;

a register which stores a signal parameter for the reference clock signal, wherein the signal parameter indicates a number of pulses of the reference clock signal included in one horizontal time;

a data driver which applies data signals to data lines connected to pixels based on the one horizontal time; and a controller which changes the signal parameter based on a change in the frequency of the reference clock signal in a way such that the one horizontal time is maintained substantially constant.

2. The display device of claim 1, wherein the controller calculates a ratio between a first frequency and a second frequency of the reference clock signal, and changes the signal parameter based on the ratio, wherein the first frequency corresponds to previous frequency information of the reference clock signal at a previous time point, and wherein the second frequency corresponds to the frequency information of the reference clock signal at a current time point.

3. The display device of claim 2, wherein the controller calculates the ratio using a lookup table in which the ratio corresponding to the first frequency and the second frequency is defined.

4. The display device of claim 2, wherein the controller generates a changed signal parameter by multiplying the signal parameter by the ratio.

5. The display device of claim 2, wherein the controller compensates the ratio based on sequence information indicating sequential operations of the oscillator in response to the frequency information.

6. The display device of claim 5, wherein the oscillator gradually changes the frequency of the reference clock signal from the first frequency to the second frequency based on the sequence information, and wherein the controller gradually changes the ratio to a target ratio corresponding to the second frequency in response to a gradual change in the frequency of the reference clock signal.

7. The display device of claim 1, wherein the frequency information is provided from an application processor, and wherein the frequency information is set in a way such that a fundamental frequency and a harmonic of the reference clock signal avoid a communication band through which data is transmitted between the application processor and an external device.

8. The display device of claim 7, wherein the oscillator changes the frequency of the reference clock signal based on the frequency information until sensitivity of the communication band becomes equal to or greater than a reference sensitivity.

9. The display device of claim 1, wherein the controller counts a number of clocks of the reference clock signal in response to an external clock signal, calculates the ratio based on the number of the clocks of the reference clock signal, and changes the signal parameter based on the ratio.

10. The display device of claim 9, wherein the oscillator changes the frequency of the reference clock signal in a porch section, and wherein the controller changes the signal parameter in the porch section.

11. A method of driving a display device, the method comprising:

generating a reference clock signal having a frequency corresponding to frequency information;

calculating a ratio based on a predetermined reference frequency and the frequency of the reference clock signal;

updating a changed signal parameter by changing a signal parameter based on the ratio, wherein the signal parameter is set to be corresponding to the reference frequency, and the signal parameter indicates a number of pulses of the reference clock signal included in one horizontal time;

generating a driving control signal based on the reference clock signal and the signal parameter; and applying data signals to data lines connected to pixels based on the one horizontal time according to the driving control signal, wherein the updating the changed signal parameter includes changing the signal parameter in a way such that the one horizontal time is maintained substantially constant.

12. The method of claim 11, wherein the calculating the ratio includes using a lookup table, in which the ratio corresponding to the predetermined reference frequency and the frequency is defined, to calculate the ratio.

13. The method of claim 12, wherein the updating the changed signal parameter comprises generating the changed signal parameter by multiplying the signal parameter by the ratio.

14. The method of claim 11, further comprising:

receiving the frequency information from an application processor, wherein the frequency information is set in a way such that a fundamental frequency and a harmonic of the reference clock signal avoid a communication band through which data is transmitted between the application processor and an external device.

15. The method of claim 14, wherein the receiving the frequency information includes:

receiving sensitivity of the communication band from the external device by the application processor;

changing the frequency information in response to the sensitivity by the application processor when the sensitivity is lower than a reference sensitivity; and requesting the external device to identify the sensitivity of the communication band in response to a change of the frequency information.

16. The method of claim 11, wherein the calculating the ratio includes compensating the ratio based on sequence information indicating sequential operations for generating the reference clock signal in response to the frequency information.

17. The method of claim 11, wherein the calculating the ratio includes:

counting a number of clocks of the reference clock signal having the frequency in response to an external clock signal; and calculating the ratio based on a number of reference clocks corresponding to the reference frequency and the number of the clocks of the reference clock signal.

* * * * *